(12) United States Patent
Patel

(10) Patent No.: US 6,757,667 B1
(45) Date of Patent: Jun. 29, 2004

(54) METHOD FOR OPTIMIZING FORMULATIONS

(75) Inventor: Shail Patel, Wirral (GB)

(73) Assignee: Unilever Home & Personal Care USA, division of Conopco, Inc., Greenwich, CT (US)

(*) Notice: Subject to any disclaimer, the term of this patent is extended or adjusted under 35 U.S.C. 154(b) by 457 days.

(21) Appl. No.: 09/691,786

(22) Filed: Oct. 19, 2000

(30) Foreign Application Priority Data

Apr. 12, 2000 (EP) ............................................ 00303103

(51) Int. Cl.⁷ ............................................ G06F 15/18
(52) U.S. Cl. ............................................ 706/19; 706/21
(58) Field of Search ............................................ 706/13, 19, 12, 706/21, 25, 16

(56) References Cited

U.S. PATENT DOCUMENTS

| | | | |
|---|---|---|---|
| 5,222,192 A | 6/1993 | Shaefer | 706/13 |
| 5,390,282 A | 2/1995 | Koza et al. | 706/13 |
| 5,394,509 A | 2/1995 | Winston | 706/13 |
| 5,630,070 A | 5/1997 | Dietrich et al. | 705/8 |
| 5,719,794 A | 2/1998 | Altshuler et al. | 703/1 |
| 5,734,796 A | 3/1998 | Pao | 706/16 |
| 5,774,761 A * | 6/1998 | Rai | 399/46 |
| 5,781,430 A * | 7/1998 | Tsai | 700/28 |
| 5,809,490 A | 9/1998 | Guiver et al. | 706/16 |
| 5,842,192 A * | 11/1998 | Garcia et al. | 706/45 |
| 5,848,402 A | 12/1998 | Pao et al. | 706/13 |
| 5,853,377 A | 12/1998 | Madsen et al. | 600/587 |
| 5,855,009 A * | 12/1998 | Garcia et al. | 706/45 |
| 5,892,190 A * | 4/1999 | Morita et al. | 187/382 |
| 5,903,474 A | 5/1999 | Sadler et al. | 703/2 |
| 5,926,803 A | 7/1999 | Kitano | 706/13 |
| 5,940,816 A | 8/1999 | Fuhrer et al. | 706/13 |
| 2001/0032029 A1 * | 10/2001 | Kauffman | 700/99 |
| 2003/0014379 A1 * | 1/2003 | Saias et al. | 706/45 |

FOREIGN PATENT DOCUMENTS

| | | | |
|---|---|---|---|
| EP | 0 460 037 B1 | 12/1991 | B01D/3/42 |
| EP | 0 581 273 A1 | 2/1994 | B01J/19/00 |
| EP | 0 831 405 A2 | 3/1998 | G06F/17/17 |
| EP | 0 927 944 A1 | 7/1999 | G06F/17/60 |
| WO | 90/09831 | 7/1990 | B01D/3/42 |
| WO | 96/24033 | 8/1996 | G01J/3/46 |
| WO | 97/20076 | 6/1997 | C12Q/1/68 |
| WO | 98/13776 | 2/1998 | G06F/17/60 |

OTHER PUBLICATIONS

European Search Report EP 00 30 3103 dated Oct. 6, 2000, 2 pp.

"Optimizing Product Formulations Using Neural Networks", *Scientific Computing & Automation*, (Sep. 1992), pp. 19–26.

"Multicriteria steepest ascent in a design space consisting of both mixture and process variables", *Chemometrics and Intelligent Laboratory Systems 30*, (1995) pp. 23–36.

* cited by examiner

Primary Examiner—Wilbert L. Starks, Jr.
Assistant Examiner—Kelvin Booker
(74) Attorney, Agent, or Firm—Alan A. Bornstein

(57) ABSTRACT

A method is described for using a computer for optimizing formulations against a number of criteria. A model algorithm is provided for each of the criteria, each model algorithm providing a prediction for a corresponding criteria when a candidate formulation is inputted into the model algorithm. Criteria are selected to optimize a set of candidate formulations. An algorithm is provided for optimization of the set of candidate formulations in accordance with the selected criteria. A first set of candidate formulations is provided and the optimization algorithm generates one or more new candidate formulations. All candidate formulations are inputted into the number of model algorithms to obtain predictions, and information of the set of candidate formulations obtained by generation and/or previous optimizations and/or experiments is used to select candidate formulations from the set to obtain a Pareto optimal set of candidate formulations.

20 Claims, 12 Drawing Sheets

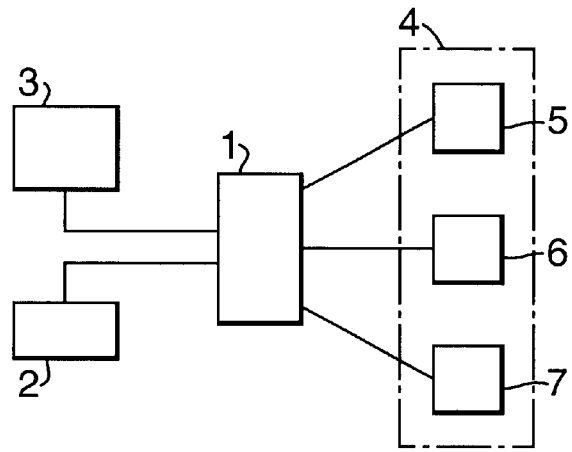
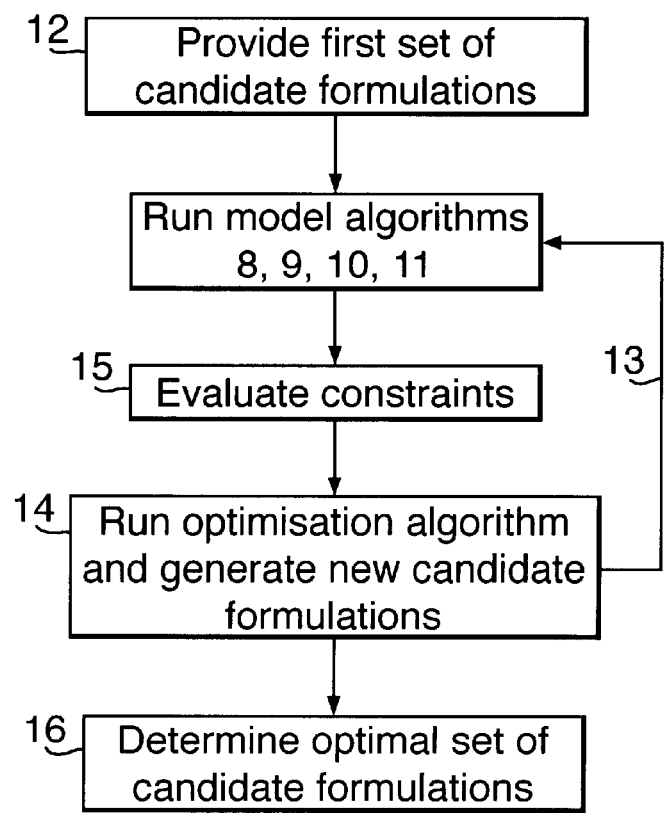

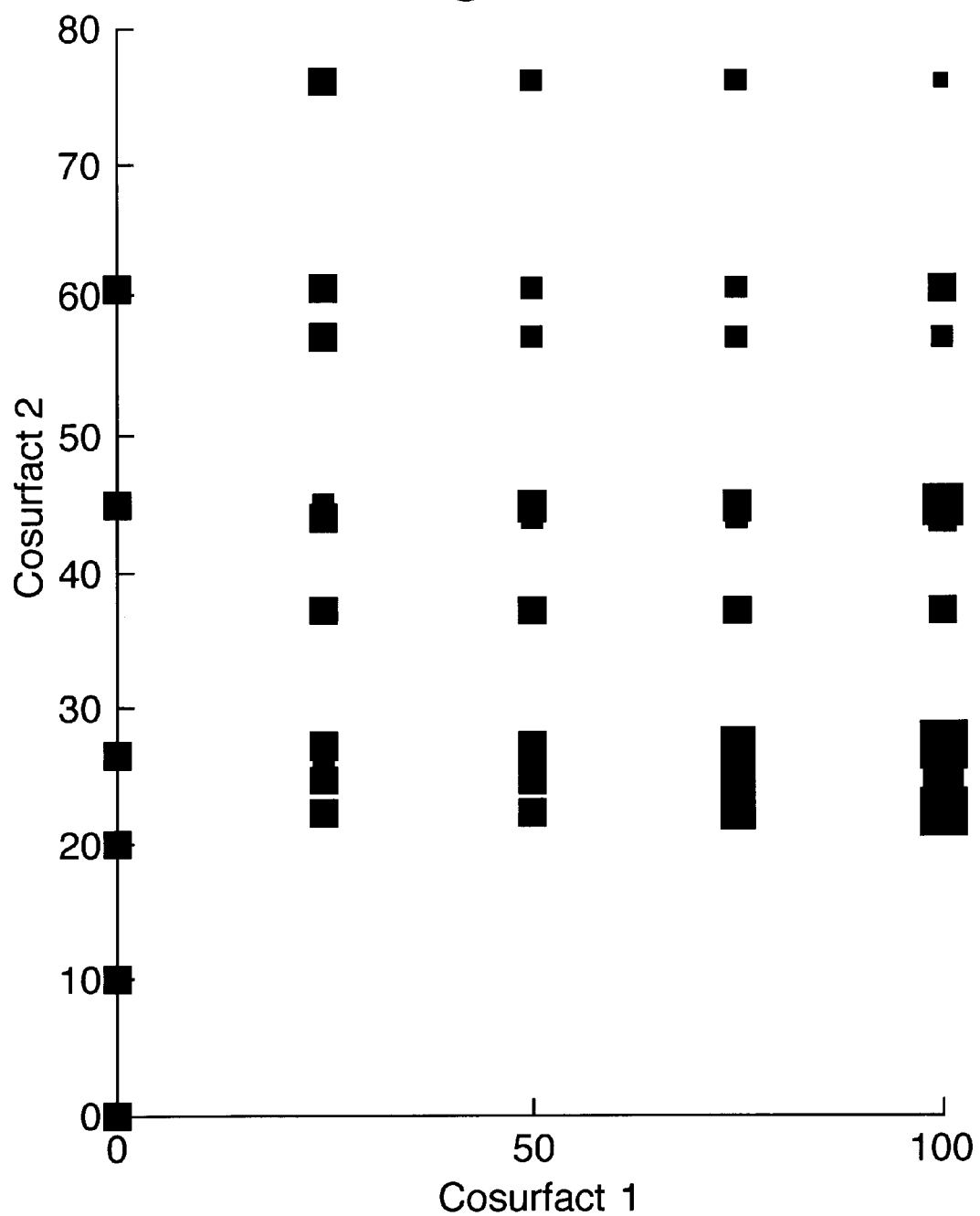

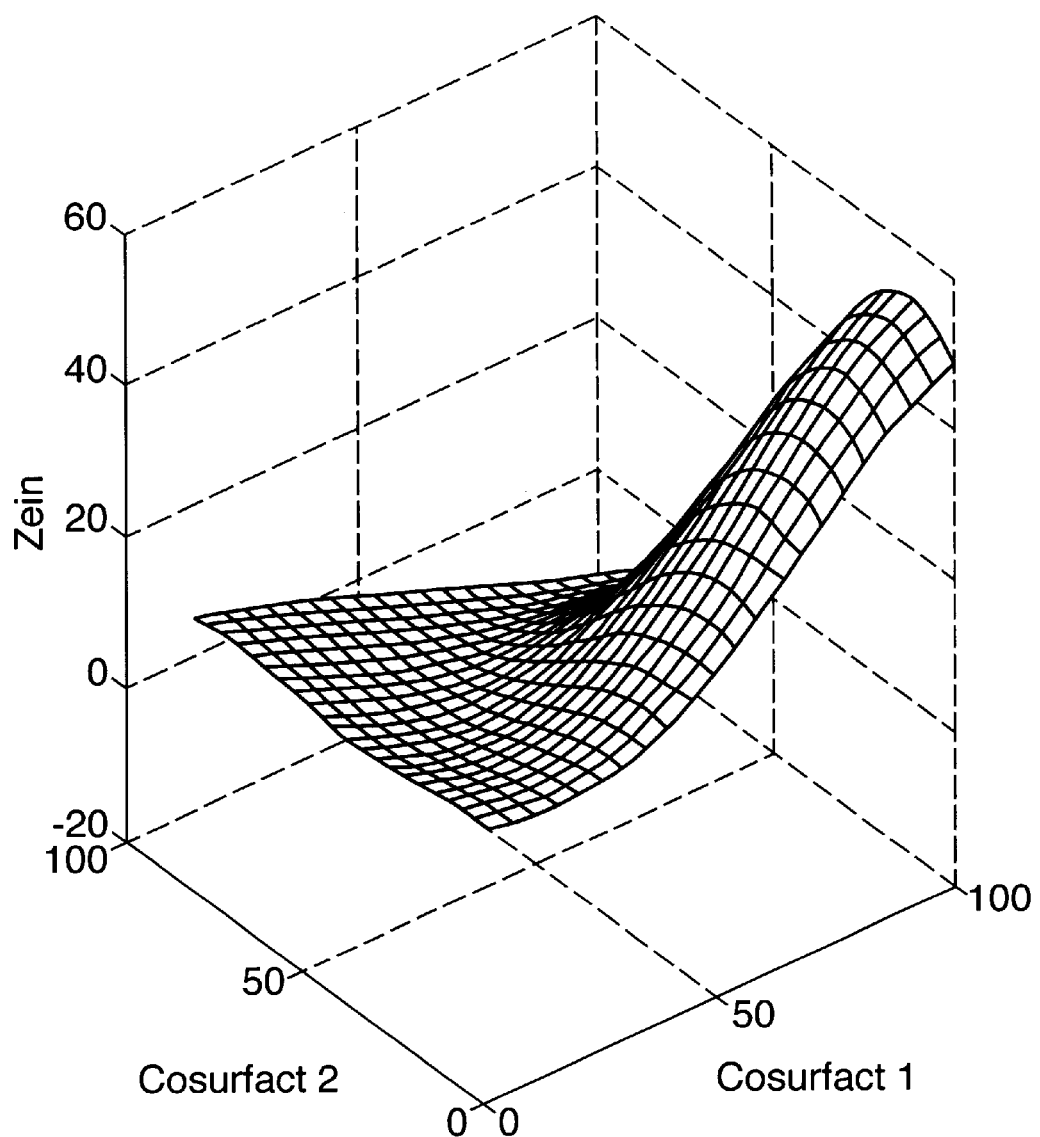

Fig.13.
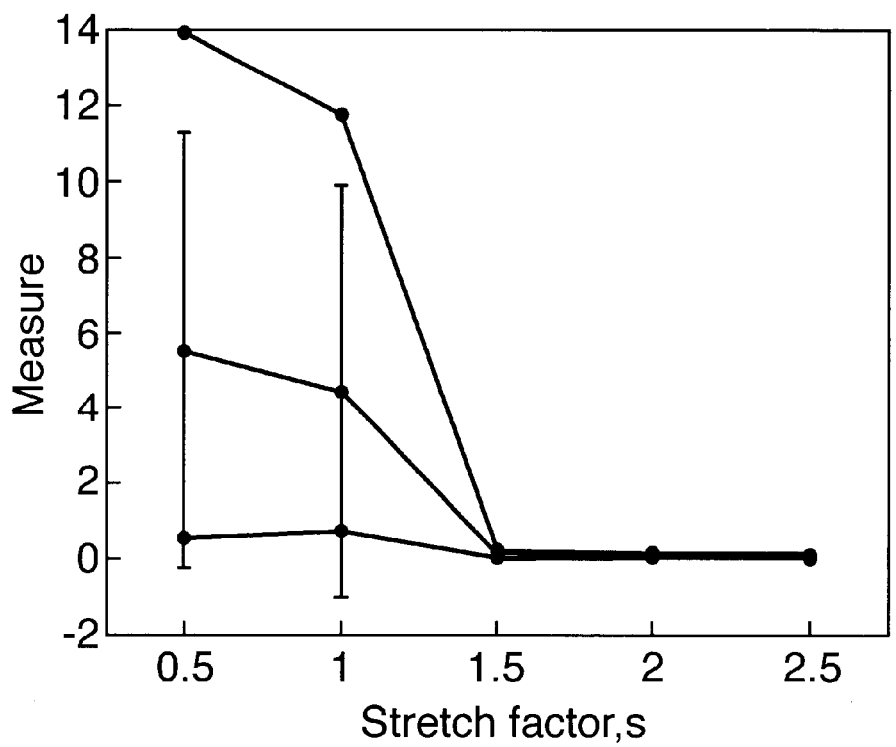
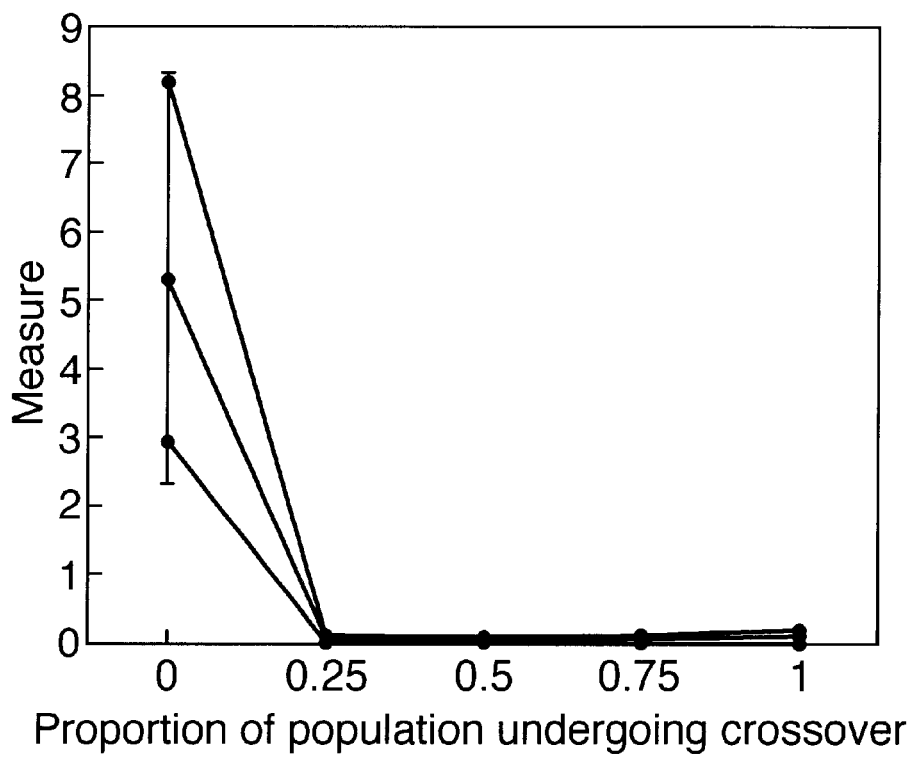

Fig.14.
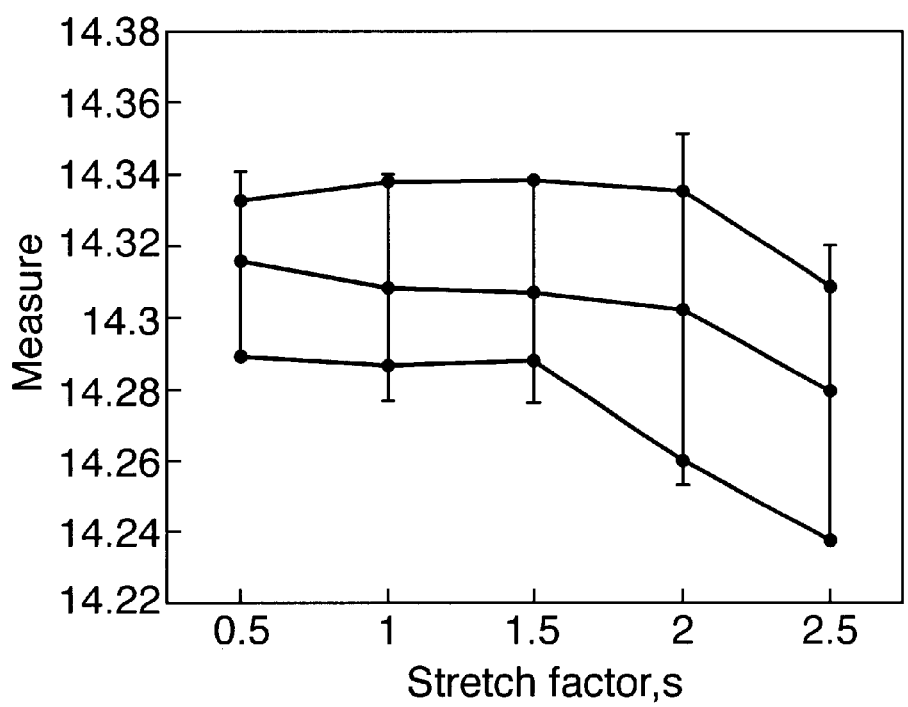
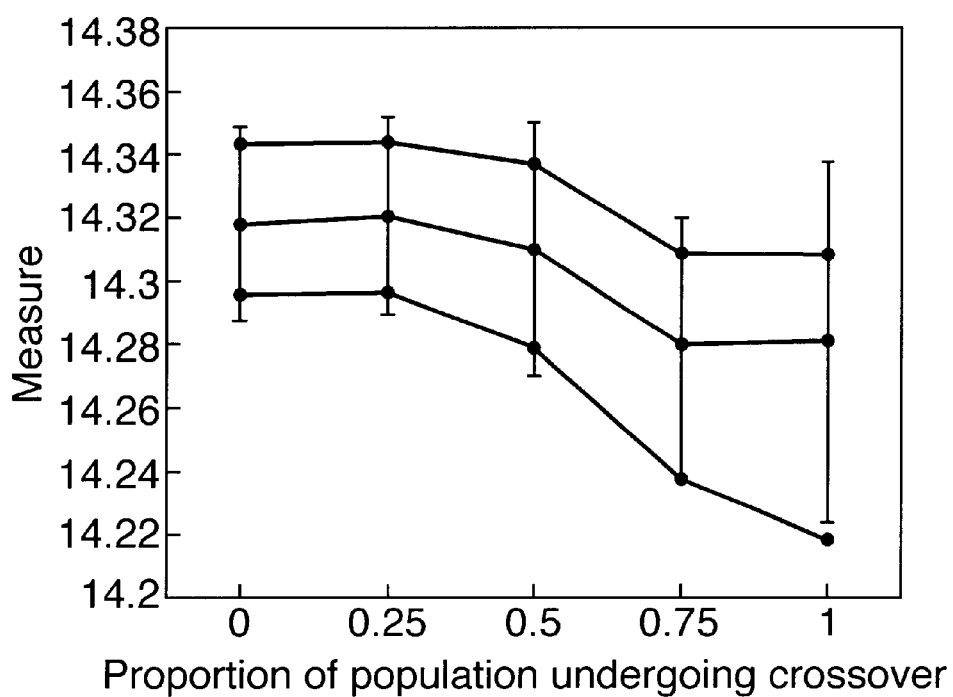

METHOD FOR OPTIMIZING FORMULATIONS

BACKGROUND OF THE INVENTION

The present invention relates to a method for optimising formulations against a number of criteria. The method can advantageously be applied by using a computer operated optimisation process.

1. Field of the Invention

An example of a optimisation method of this type is known in practice as CAD/Chem. The method comprises the use of a neural net model which provides property predictions on the input of a candidate formulation. An optimisation algorithm is used to find a formulation against a set of desired properties. Property weights must be assigned to each property to indicate the relative importance of each particular property. Constraints on formulation ingredients and processing parameters may be expressed as rules. This method forces the user to assign a relative ranking to the criteria against which the formulation is to be optimised before running the optimisation algorithm, so that although an optimised formulation is obtained the relative ranking is an inherent part of this formulation found, wherein the user can not see the effect of trade-offs between the criteria.

WO 9720076 discloses methods for optimising multicomponent formulations, wherein a large number of mixtures are analysed to determine the formulation(s) with optimal properties. In this known method a marker is associated with each candidate formulation. It will be clear that this method is time consuming and requires significant amounts of labour and costs.

U.S. Pat. No. 5,940,816 discloses a method for using a computer for multi-objective decision-support to improve a candidate solution for a transportation problem. There is no suggestion that this method is suitable to support in optimising formulations.

2. The Related Art

The invention aims to provide an improved method for using a computer for optimising formulations against a number of criteria.

SUMMARY OF THE INVENTION

According to the invention a method is provided for optimising formulations against a number of criteria, comprising the steps of
 (a) providing a model algorithm for each of the criteria, each model algorithm providing a prediction for a corresponding criteria when a candidate formulation is inputted into the model algorithm; and
 (b) selecting criteria to optimise a set of candidate formulations; and
 (c) providing an algorithm for optimisation of the set of candidate formulations in accordance with the selected criteria;
wherein a first set of one or more candidate formulations is provided and wherein the optimisation algorithm generates one or more new candidate formulations and wherein all candidate formulations are inputted into the number of model algorithms to obtain predictions, and wherein information of the set to candidate formulations obtained by said generation and/or previous optimisations and/or experiments is used to select candidate formulations from the set to obtain a Pareto optimal set of candidate formulations.

In this manner a method is provided by means of which a Pareto optimal set of candidate formulations is obtained with varying trade-offs between criteria. The trade-offs between different desired criteria can be examined in an easy manner without the effort of preparing large numbers of mixtures. The information obtained can be used in further selecting formulations for further actual testing of formulations.

For the purpose of the invention the term formulation optimisation refers to the fact that for a formulation the type of ingredients, their relative levels and the conditions of preparing the final formulation are chosen such that an desired end formulation is obtained.

For example an optimisation with reference to the type of ingredient may provide assistance is determining which choice out of a number of alternatives can be used. For example choice of emulsifiers, surfactants, thickeners etc.

An optimisation with reference to the relative level of ingredients may for example start from a list of ingredients and aim to find an optimised combination of those. For example the optimisation process may provide an indication of ratios of surfactant materials or fat mixtures in products.

An optimisation with reference to the conditions for preparing the final formulation may for example take into account processing conditions such as temperature, mixing speed, maturing times and aim to find optimal combinations of these.

Very often a formulation optimisation process in accordance to the invention will take into account more than one of the above elements. Preferred optimisation processes in according to the invention involve the optimisation with reference to the relative level of ingredients as described above. This may then optionally be combined with optimisation with respect to the type of ingredients and/or with reference to the manufacturing conditions.

According to a preferred embodiment the method of the invention can include a number of iteration steps in a loop as follows:
 (i) a first set of one or more candidate formulations are used as starting point;
 (ii) candidate formulations are inputted into the number of model algorithms to obtain predictions, and
 (iii) the optimisation algorithm generates one or more new candidate formulations; and
 (iv) the new candidate formulations are used as input into the number of model algorithms in iteration step (ii), and wherein a Pareto optimal set of predictions are determined for selecting the candidate formulations.

The invention will be further explained by reference to the drawings in which an embodiment of the method of the invention is schematically shown.

BRIEF DESCRIPTION OF THE DRAWINGS

FIG. 1 schematically shows a system for example a computer suitable for carrying out the method of the invention for example by running a program to carry out an embodiment of the method of the invention.

FIG. 2 schematically shows a diagram of an embodiment of the invention.

FIG. 6A shows the comparison of the actual mildness empirical data set where the input data distribution is shown and the size of the marker represents the mildness measure.

FIG. 6B shows the empirical Gaussian process model's response that is depicted in FIG. 6A.

FIG. 13. Shows the distance from Pareto front for increasing stretch and varying crossover.

FIG. 14. Shows the distance from Pareto front for increasing stretch and varying crossover.

DETAILED DESCRIPTION OF THE INVENTION

Figure 3A:
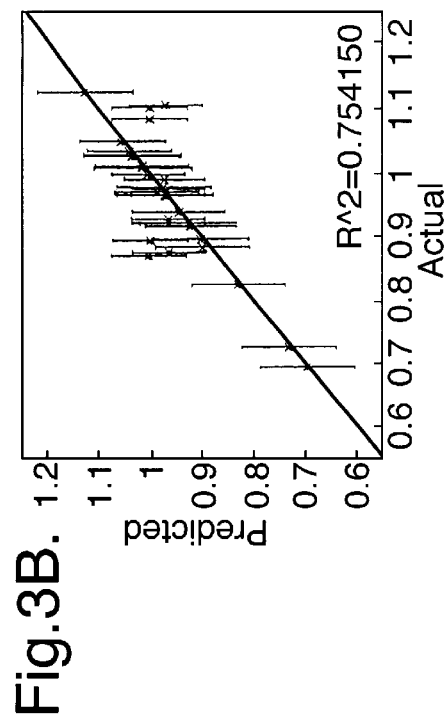
FIGS. 3A&B and 4A&B show graphs for explaining the method of the invention.

In the following description an embodiment of a method for optimising formulations against a number of criteria will be described.

In optimising formulations, the method described can be used for optimising formulations in the fields of detergent products, food products, personal care products, fabric care products, household care products, beverages and the like.

FIG. 1 schematically shows in a simplified manner a computer 1 having a keyboard 2 and a monitor 3 for user interaction with the program embodying the method described. Further the computer 1 comprises a memory 4 schematically indicated by a dashed line which may include both a hard disk memory and RAM memory. All model algorithms which can be used in carrying out the method are stored in a first part 5 of the memory, i.e. a model algorithm store 5. The model algorithms may be based on experimental data and/or physical/chemical knowledge. In a preferred embodiment of the invention at least one of the model algorithms used provides a prediction together with a prediction error bar on the input of a candidate formulation. The prediction error bar may be linear or non-linear. Such a model algorithm providing a prediction together with a prediction error bar may be any system capable of prediction error calculation for example it can be a Bayesian neural network. More generally, model algorithms stored in the model algorithm store 5 can be neuro-fuzzy networks, neural networks, linear regression models, genetic function approximation, arithmetic models, etc.

As example of model algorithms stored in store 5 can be mentioned models providing predictions and, if applicable, prediction error bars on cost, molecular/mesoscale properties, such as micelle characteristics and product structure, material (physical/chemical) properties, such as detergency, foam height, bubble size, and rheological parameters, biological properties, such as toxicity, biodegradation, and antibacterial activity, sensory properties, such as foam sensory properties, slipperiness, crunchiness, and flow, and consumer perception properties, such as shine, clean, and overall liking.

The memory 4 further comprises a second part or optimisation algorithm store 6 for storing optimisation algorithms, including preferably a multi-criteria optimisation algorithm, in particular a Pareto optimal genetic optimisation algorithm also known as multi-objective genetic algorithm. The optimisation algorithm store 6 may further comprise single-criteria optimisation algorithms, such as sequential quadratic programming or simplex method algorithms.

Finally the memory 4 comprises a candidate formulation store 7 for storing candidate formulations or more generally candidate solutions found as a result of running the optimisation method. During running the computer program embodying the method, a user can interact with the method through a suitable user interface.

The method will be further described by means of the flow diagram shown in FIG. 2 with particular reference to the optimisation of a detergent formulation.

STEP I:

Depending on the specific formulation optimisation, the user will have to select from the model algorithm store 5 the model algorithms corresponding to the criteria against which the formulations are to be optiomised. These model algorithms are to be used in the method. For example in the optimisation of a detergent formulation, four model algorithms 8–11 may used, wherein model algorithm 8 is an arithmetic model providing a cost prediction based on the type and levels of the ingredients in the formulation. Model algorithm 9 is a Bayesian neural network providing predictions and prediction error bars on the foam properties of the detergent formulation based on the type and levels of the ingredients in the formulation. Model algorithm 10 is a Bayesian neural net providing a prediction and prediction error bar on mildness of the detergent formulation. Finally, model algorithm 11 is a model based on physical/chemical knowledge providing a prediction and prediction error bar on detergency of the detergent formulation.

STEP II:

In a preferred embodiment of the invention a number of constraints can be defined or selected by the user in an interactive manner to define the window wherein candidate formulations will be evaluated. These constraints may for example be constraints in the formulation space and/or may be lower and/or upper boundaries for each formulation component. For example for a detergent formulation such constraints may define the minimum level of surfactant materials, builders etc. Such constraints may where appropriate be determined by some model, for example a heuristic or rule-based processing model. Further examples of possible constraints are combinations of variables in the formulation space. For example a simplex constraint $\rho x_i = 1$ or $< 1$, i.e. there should not be more than 100% of components in a formulation. Other constraints may be dependent on legislative or chemical requirements.

Further constraints can be defined or selected by the user in an interactive manner, which constraints apply to the predictions and/or prediction error bars, i.e. to the property space. Possible constraints are for example the requirement that error bars are less than some value and/or specific ranges for the prediction values.

STEP III:

Before running the method, the optimisation algorithm must be selected from the optimisation algorithm store 6 and criteria to optimise on are defined. These criteria are for example predictions, prediction error bars, if applicable, whether to maximise or minimise. In the embodiment described a genetic algorithm is used to find a Pareto optimal set of candidate formulations. According to the method described the Pareto optimisation algorithmoperates to optimise formulations against multiple criteria without requiring the user to provide weight factors or the like before running the optimisation method. In this manner a set of Pareto optimal candidate formulations or solutions will be obtained. By examining the formulations the user of the method can see the trade-offs between criteria. In this manner the user can obtain relevant information at low cost as it is not necessary to prepare large numbers of different formulations for actual testing to determine the properties. By evaluating the information obtained, the user can decide on the actual formulations for further testing.

STEP IV:

To start the optimisation, a first set of candidate formulations schematically shown at 12 in FIG. 2 is provided, which set of candidate formulations comprises at least one formulation. It is noted that the term set means a number of formulations or more generally solutions of at least one. The first set of candidate formulations may be a random set or may be obtained from previous actual formulations or may be the result of previous optimisations. According to a specific embodiment of the invention, a candidate formulation may be obtained by carrying out the method with a weighted optimisation, wherein the criteria to optimise on are weighted. Such a weighted optimisation results in one formulation and one or more of formulations obtained in this manner can be used as seeds for running the optimisation method with the multi-objective genetic algorithm without the use of weighted criteria.

STEP V:

With the first set of formulations 12 a number of iteration steps are carried out in an iteration loop as schematically indicated by line 13. The number of iteration steps can be preset at a given number N or can be random until convergence of generated formulations. The candidate formulations are provided as input to the model algorithms 8–11 (e.g. as described above) resulting in a number of predictions and/or prediction error bars. As indicated by block 14 the optimisation algorithm generates one or more new candidate formulations and forwards these new candidate formulations as input to the model algorithms 8–11. Block 15 indicates the use of the defined constraints in running the optimisation method.

For the purpose of the invention the optimisation algorithm is adapted to generate Pareto optimal candidate formulations.

In the step of generating new formulations it is preferred to tune the generation of new candidate formulations to the landscape character of the formulation landscape. The landscape of formulations is a smooth landscape, wherein in case of a genetic optimisation algorithm it is preferred to use a line search cross-over operator for generating new candidate formulations. As an alternative for a line search cross-over operator it is possible to use a gradient decent algorithm to generate new candidate formulations. Further in general in the generation of new candidate formulations cross-over operators, inversion operators, mutation operators and clone operators could be used in the genetic algorithm.

STEP VI:

In a final step 16 of the method described the Pareto optimum set of candidate formulations is selected from the set of formulations obtained through the iteration steps and/or obtained by any previous optimisations and/or by experiments, and by this selection an optimised set of candidate formulations is obtained. The set of candidate formulations obtained after the iterations steps may comprise newly generated candidate formulations and/or candidate formulations of the first set. The optimised set of candidate formulations can be stored in candidate formulations store 7 for further use.

Figure 5:
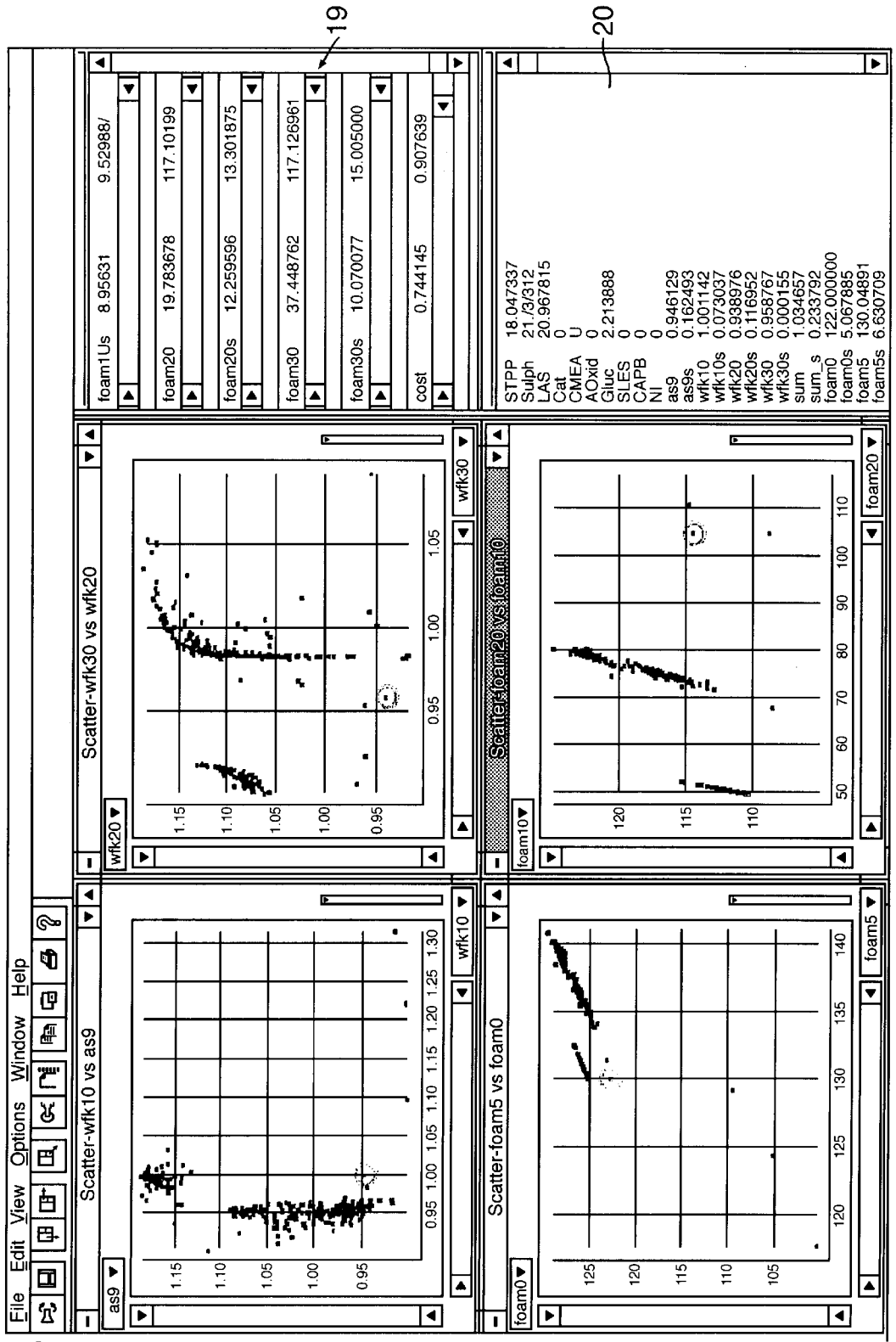
FIG. 5 shows a screen display showing a set of solutions obtained by means of the method of the invention.

The candidate formulations obtained as a result of the optimisation can be evaluated by visual inspection of the trade-offs between two or more criteria. FIG. 5 shows by way of example four windows each showing the set of Pareto optimised formulations (represented by dots) against two criteria, for example in this case predicted detergency and foam. This visualisation can be used to interact in a dynamic manner with results of the optimisation. By moving slider bars 19 the constraints on the formulations and ranges of desired properties can be varied.

In the display example of FIG. 5, one formulation is highlighted and the predicted properties of these formulations are shown in window 20.

It is noted that evaluation of the results of the optimisation is possible by applying further constraints to filter the set of formulations obtained by the optimisation. Of course, chemical knowledge may also be used in evaluation.

Some of the candidate formulations can be selected to perform further experiments. The method of selection may be algorithmic, e.g. maximising the spread in the formulation space, and/or heuristic, e.g. use of chemical knowledge. Further experiments can be done using classical bench techniques or high throughput screening. The results obtained by the further experiments on actual formulations can be used to improve the model algorithm. This will result in the model algorithms providing more accurate predictions and if applicable more accurate prediction error bars.

Figure 3B:
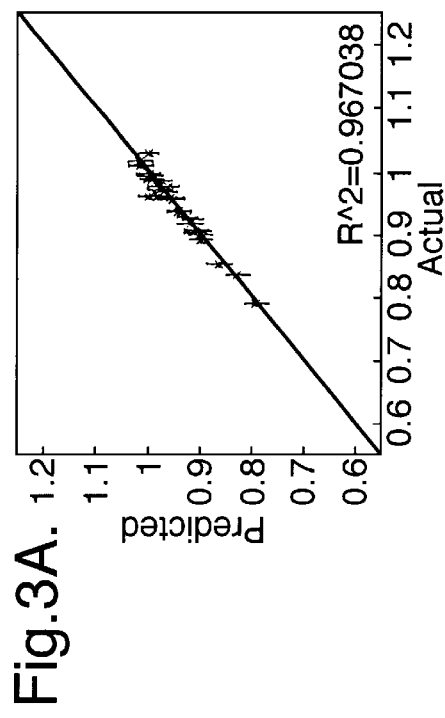

FIG. 3 shows by way of example the ability of a Bayesian neural network to model the noise in the data. The graphs shown in FIG. 3 show how the prediction error bars can vary significantly in the predictions of detergency on two typical test clothes A (FIG. 3A) and B (FIG. 3B). The larger error bars in FIG. 3B indicate a noisier data set. The graph indicates that the A test cloth has better quality control, whereas B suffers from a larger variation in cloth quality and response. More generally it can be seen that the use of error bars provides relevant information to the user in evaluating the predictions of candidate solutions and in deciding on the selection of candidate formulations for carrying out further tests.

Figure 4A:
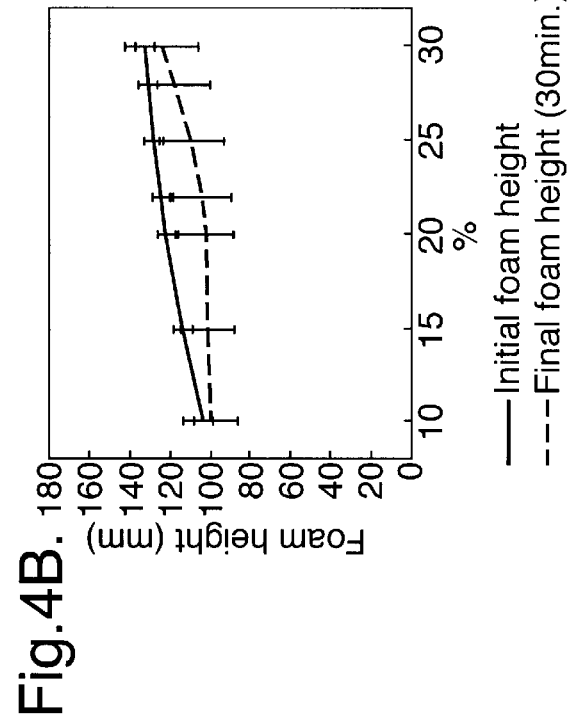
Figure 4B:
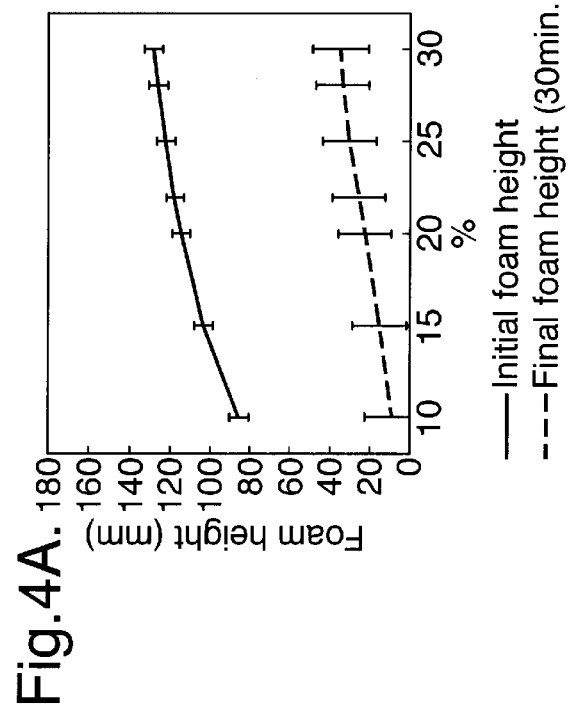

It is possible to investigate the effect of varying formulations by examining the predictions obtained from the model algorithms. FIG. 4 shows by way of example in case of a detergent formulation the effect of varying the surfactant level on foam height without (FIG. 4A) and with (FIG. 4B) a foam booster. FIG. 4B indicates that adding 3% foam booster will result in a more stable foam even at the lower surfactant levels.

As noted above, the optimisation method can also be used for example to optimise food product formulations, such as a margarine product. In the method model algorithms may for example be used for cost and solid fat content at different temperatures.

Although in the embodiment described the optimisation method uses an iteration loop comprising running the model algorithms and running the optimisation algorithm to generate new candidate formulations, it is possible to run the optimisation algorithm to generate new candidate formulations and to run the model algorithms afterwards to obtain predictions and, if applicable, prediction error bars and then use the defined constraints and select formulations using all available information to obtain an optimised set of formulations. Moreover it is not necessary to have a final selection step to obtain the optimised set if a Pareto or other optimisation is involved in generating new candidate formulations.

EXAMPLE I

This example describes the method of the invention being applied to the formulation optimisation of a shower gel that is mild to the skin. A random formulation of a shower gel comprising 2 surfactant materials (cosurfactant 1 and cosurfactant 2) was used as the starting formulation.

Prediction algorithms for predicting mildness as a function of the level of the two ingredients were defined based on data was collected about how mildness varied for two ingredients and this was modeled using a Gaussian process model. The prediction algorithm also provided a value for the error bar in the prediction.

FIG. 6A shows the the comparison of the actual mildness empirical data set where the input data distribution is shown and the size of the marker represents the mildness measure and FIG. 6B the empirical Gaussian process model's response (right).

Figure 7A:
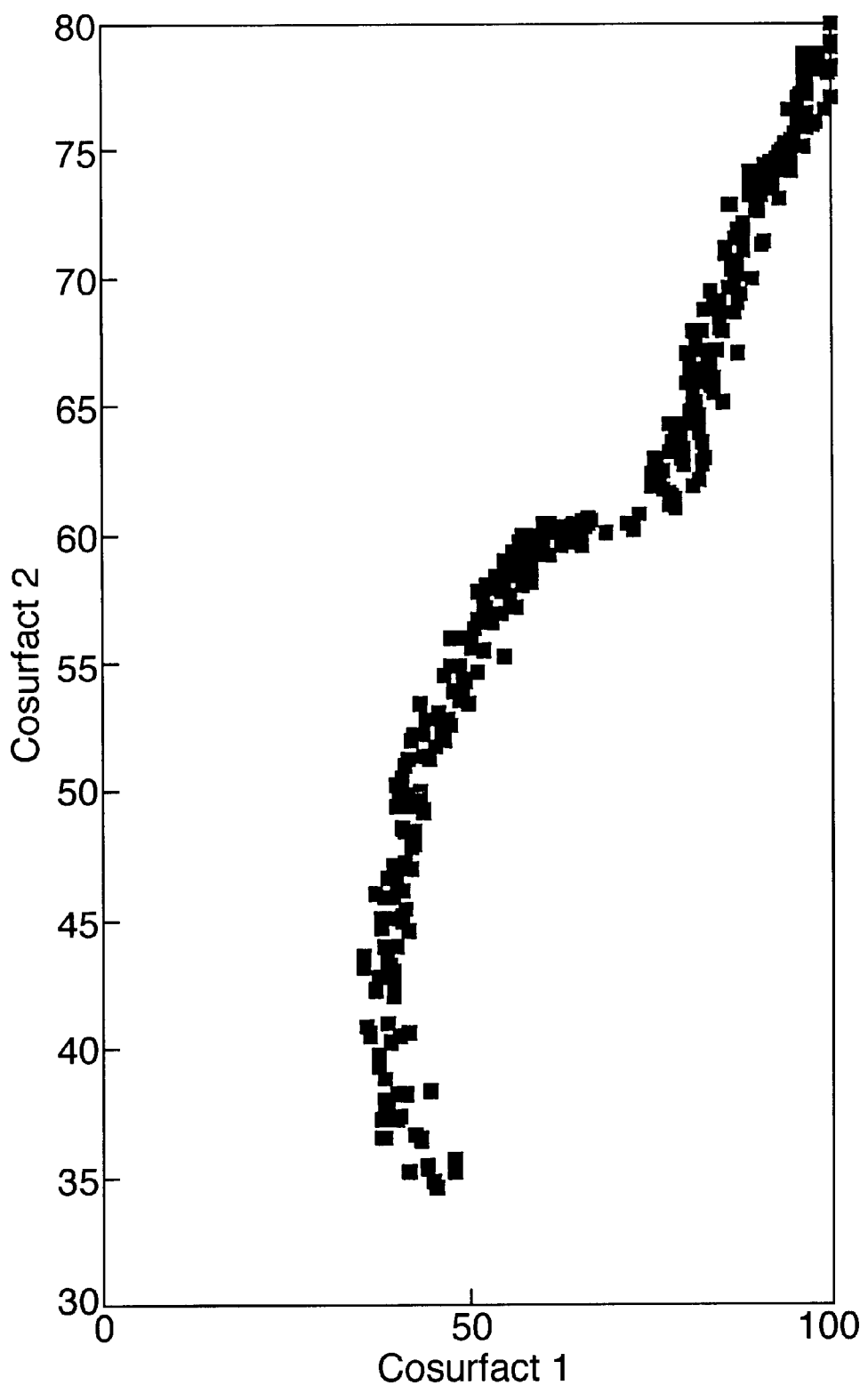
FIG. 7A shows the set of formulations when the model is optimised to simultaneously minimize both the prediction and the corresponding error bar.

When the model is optimised to simultaneously minimise both the prediction and the corresponding error bar, the set of formulations shown in FIG. 7A is calculated. In this example, the range of the predicted error bars (FIG. 7B) is fairly small, which is a consequence of having a data set where the points are distributed fairly evenly. However, when the model is unconditionally minimised, the extreme value occurs where the data is fairly sparse and the error bar is relatively large (where both ingredients are large). It is then up to the designer to decide whether they balance minimising the mildness measure with accepting the risk that the model's prediction may be inaccurate. Including error bars as objectives in the Pareto optimisation, ensures that reliable solutions are represented in the final solution set, as well as speculative values.

Figure 7B:
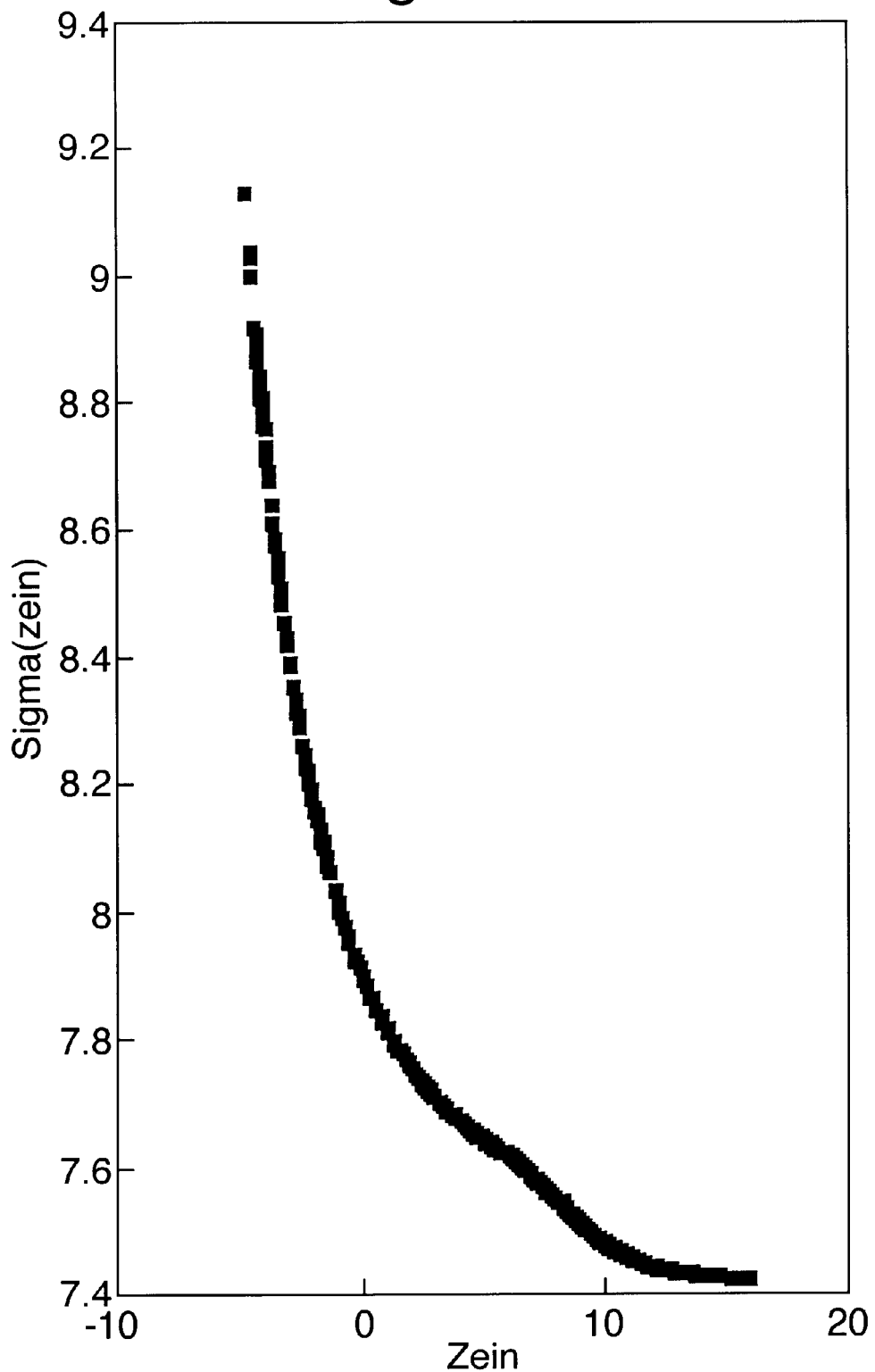
FIG. 7B shows the range of the predicted error bars depicted in FIG. 7A.

FIGS. 7A and 7B shows the calculated Pareto front based on minimising the mildness measure and also minimising the corresponding error bar. FIG. A shows the formulation values lying on the Pareto front, whereas FIG. 7B shows the actual Pareto front.

EXAMPLE II

As a general property of the chemistry inherent in formulations, formulation landscapes are usually well behaved, and are likely to be smooth and differentiable without any significant discontinuities. An archetypal example is the pH titration curve. Increasing the relative base to acid concentration, on a simplex of total concentration=100%, results in a sigmoidal response curve for pH. Empirical modeling of formulation landscapes is typically achieved by linear, bilinear/quadratic and neural net regression methods, and the corresponding error bars can also be used to provide an indication of how confident the model is in its prediction.

This example shows how an understanding of the formulation landscape can provide important information about the type of Pareto Optimal solutions. In this example, it is assumed that the input space is convex and bounded, a simple example of which is the simplex (sum to unity) constraint that occurs in formulation optimisation problems and that the models are continuous. It is also assumed that the goal is to minimise each of the objectives. It would be within the ability of the skilled person to apply the teaching below for other goal criteria.

Case 1 Monotonic Ridge Models

A ridge model is defined as one whose contours are parallel lines (hyperplanes), hence its extreme values lie on the boundary of a bounded, convex input space and no interior extrema occur. This is monotonic when the projected function is monotonic. A simple example is a linear function, but it could also refer to a sigmoidal-type function or even polynomials of the form $(x.w+1)^d$, where w is the parameter vector and d is the order (odd) of the polynomial. When each model has these properties, there are no locally optimal Pareto fronts and the globally optimal Pareto front is a continuous curve (surface) connecting the extreme values of each model along the boundary of the input space. If the input space is a simplex, the Pareto front consists of line (hyper plane) segments.

This can be proved by assuming that an interior point can lie on the Pareto front, and that the number of objectives is less than the input space dimension (otherwise the whole space may be Pareto optimal). For any given objective it is possible to construct a direction tangent to all the remaining objectives that reduces the value of the selected objective. Hence the original point was not Pareto optimal. Therefore, Pareto optimal points can lie only on the boundary.

Figure 8:
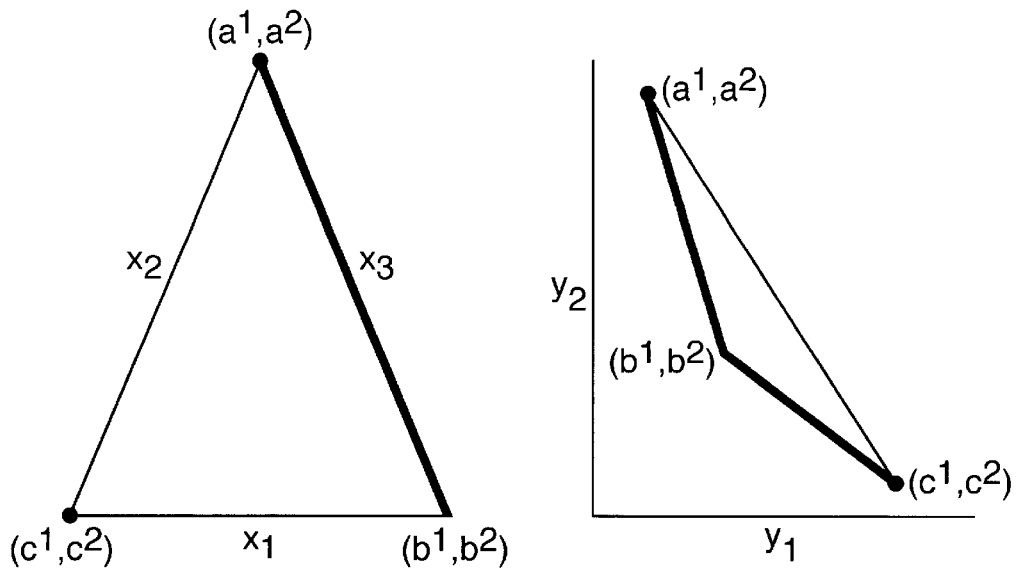
FIG. 8. Shows the Pareto optimal front (bold lines) for 2 linear models, defined on a 3 dimensional input space with a simplex constraint. The figure on the left illustrates the input space and contains the values of the two functions at the vertices. The figure on the right shows the Pareto front (bold lines) and contains the two models' outputs.

As an example, consider the case where the formulation problem is composed of two linear models (with non-zero coefficients) and the input space is a simplex (3 dimensional), each model will have a unique minimum at a vertex in the input space. Assuming that the models' minima lie on different vertices (otherwise the multi-criteria optimisation problem is trivial), the globally optimal Pareto front lies along the simplex boundary connecting the two vertices, as illustrated in FIG. 8 (bold lines) for two models of the form:

$$y_i = a^1 x_1 + b^1 x_2 + c^1 x_3 \qquad (1)$$

In this example, it is assumed that the smallest coefficient for $y^1$ is $a^1$ and the smallest coefficient for $y^2$ is $c^2$, and that in both cases, the second coefficient, b, is smaller than the average value of the other two. This is illustrated in FIG. 8.

Case 2 Non-linear Models with No Local Maxima

Figure 9:
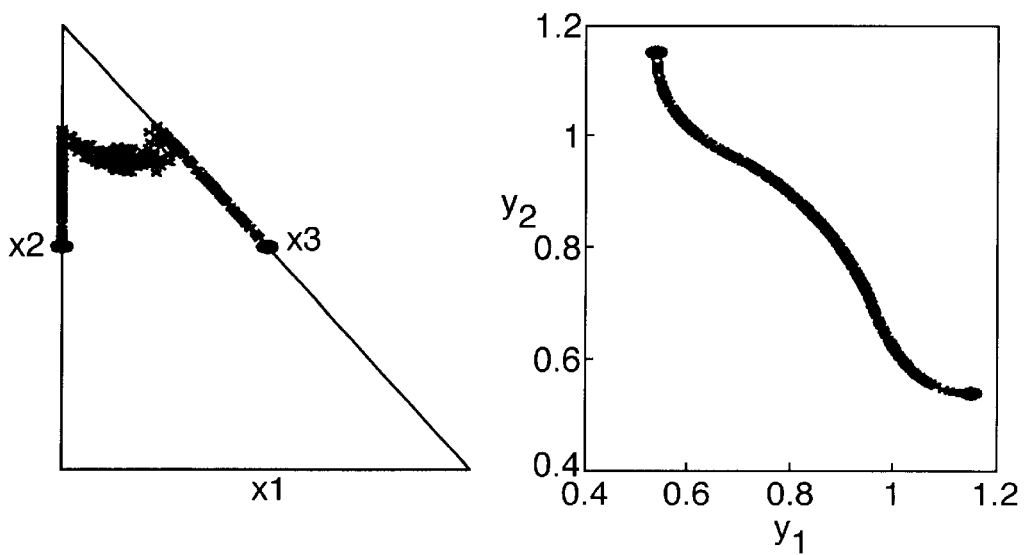
FIG. 9. Shows the globally optimal Pareto front found for a three input, simplex constrained optimisation problem, where the two objectives are each formed from the sum of two sigmoid functions. Each function's minima lies on the boundary and the connecting Pareto front lies partially on the boundary and partially on the interior of the input space.

Another useful class of models is those with no local maxima occurring in the input space. Quadratic (positive definite) models are obviously a special case and one such example is the error bar predictions associated with a linear model. Other special cases include models made up from a sum of ridge functions where the sum is taken over no more than n ridge functions (where n is the input space dimension) such functions can be shown to reach their extreme values on the boundary of the input space. In these cases, there are still no locally optimal Pareto fronts and the globally optimal Pareto front is a curved surface that stretches between the model's minima and may lie on the boundary or on the interior of the bounded input space. This is illustrated in FIG. 9 for two models, each constructed from the sum of two sigmoid functions.

Case 3 Models with Interior Maxima

Figure 10:
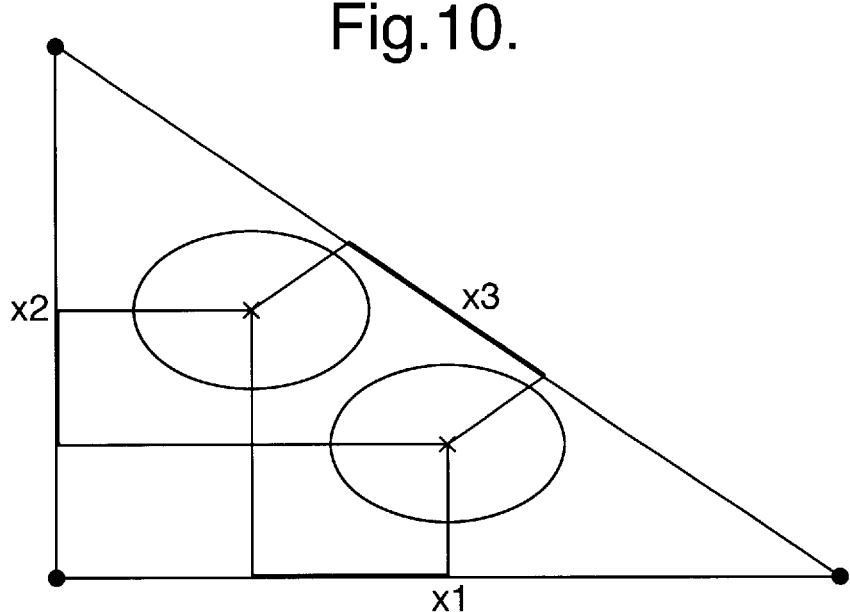
FIG. 10. Shows the set of local Pareto fronts (thick lines and vertices) for a multi-criteria optimisation problem that consists of two quadratic functions with unique maxima (crosses) that occur in the centre of the input simplex.

While the previous two cases contain many well-known modeling algorithms, they are relatively restrictive. Many models (e.g. some quadratics) will contain local maxima and potentially several local minima. While this is not theoretically a problem for global search algorithms, in practice the algorithm may become trapped in a local region for a long period of time and concentrate on the locally optimal Pareto fronts defined in that local region. To illustrate how prevalent local optimal Pareto fronts are, consider the multi-criteria optimisation problem where there are 3 inputs subject to a simplex constraint and two outputs, both quadratic models with global maxima that occur inside the simplex, as illustrated in FIG. 3. Six locally optimal Pareto fronts exist and depending on the exact geometry of the functions, the line segments along the edges of the simplex may or may not lie on the globally optimal solution. This is illustrated in FIG. 10.

The properties of formulation landscapes are therefore heavily dependent on the type of empirical models used. Simple models, such as ridge functions, have extrema that lie on the boundary of the input space and the globally optimal Pareto fronts that connect those extrema are hyper plane segments. For other simple models it can be argued that the Pareto front is also connected and smooth. This is important for the type of operators used by the evolutionary search algorithms. However, many models have maxima that occur in the input space's interior and this generates discontinuous local Pareto fronts that may or may not lie on the global solution. Hence search algorithms have to consider all regions where local Pareto fronts may exist.

From the above cases 1–3 we may summarise that the essential characteristic of a local Pareto Optimal'surface for formulation optimisation problems is that it is smooth, and can be approximated locally by (hyper-)line-segments in the search space.

The selection of a cross-over operator for a genetic algorithm search method should be inspired by some characteristic of the problem. It is known that traditional single-point cross-over is inappropriate for real-valued problems, such as formulation optimisation. When traditional single point cross-over is used, in any number of additional dimensions, the effect is the same: whilst parents are highly fit individuals, offspring must always be located at vertices defined by the parent coordinates, and therefore fixed at these points. This is sensible for binary problems, but there is no rationale as to why it should be reasonable for real-valued problems.

In the rest of this example we use a Pareto Optimal Genetic optimiser (POGO) using a line-search cross-over algorithm defined as follows:

$$O = \mu(p1-p2) + p2 \quad (2)$$

where $\mu \in [(1-s)/2, (1+s)/2]$ and typically $s \in (1,2)$. This defines the offspring, O, as being located at a random distance within the given interval beyond the centre point of the two parents (p1, p2) Once a set of points near the PO surface have been found, a line cross-over algorithm will expand the set to find the local extremas reasonably efficiently.

The use of stretch factor s allows the straightforward parameterisation of a number of ranges within which the offspring may lie, by the generation of a random $\mu$ within the given interval. For case s<1, the offspring remain between the parents; for s>1, they lie beyond them, and the effects of these is demonstrated below. This crossover can be applied to a given percentage of the population, and She effects of this are discussed further below.

The use of POGO for solving such problems is now illustrated in more detail, in an application to two formulation problems, which require optimisation of a number of components under simplex constraints. In this example, the implementation of POGO for a hypothetical linear-piecewise formulation function is explored, measuring the methods' performances in terms of: 'Distance': Mean perpendicular distance from final set of non-dominated points found to true Pareto fronts, the smaller, the better in terms of the solutions reaching the Pareto optimal goals. This provides a simple overview of the POGO behaviour on such problems.

Figure 11:
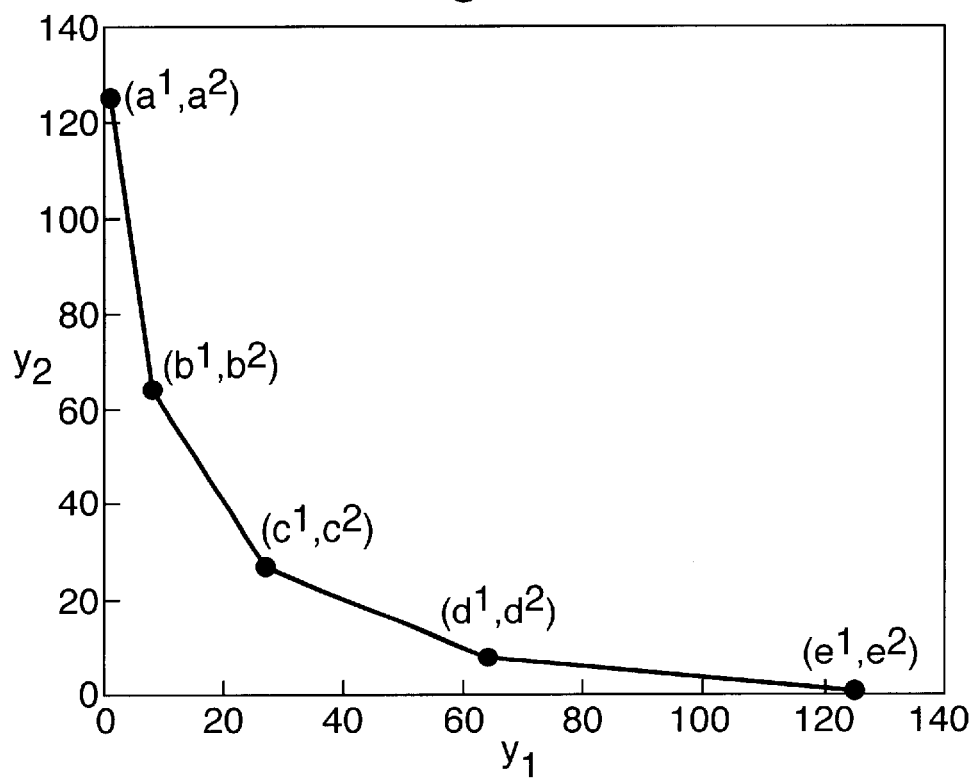
FIG. 11. Shows the Pareto optimal surface for two linear functions, defined on the seven dimensional input simplex.

In this example the test function is defined as a piecewise linear continuous function shown in FIG. 11. It contains seven input variables, with two conflicting objective functions.

$$y_1 = a^1 x_1 + b^i x_2 + c^1 x_3 + d^1 x_4 + e^i x_5 + f^i x_6 + g^i x_7$$

where $x_j \in [0,1]$ and $\Sigma_{j=1}^7 x_1 = 1$.

In this example, $x_6$ and $x_7$ are redundant in a Pareto sense.

The following experiments were performed over a series of ten runs to allow for the stochastic nature of the algorithm. The algorithm ran with a population size of 100, for 100 generations, with a mutation rate of 1%.

Two parameters were varied: the proportion of line crossover [proportion of population to which the crossover is applied] (0%, 25%, 50%, 75%, 100%) and the stretch factor for linear crossover (0.5, 1, 1.5, 2, 2.5)

From each run, the sets of non-dominated points found in the final solutions were stored, and used to calculate the values of the performance measures. The results are summarised below and demonstrate the effectiveness of POGO with its multi objective search and linear-based operator to explore these optimisation problems.

Figure 12:
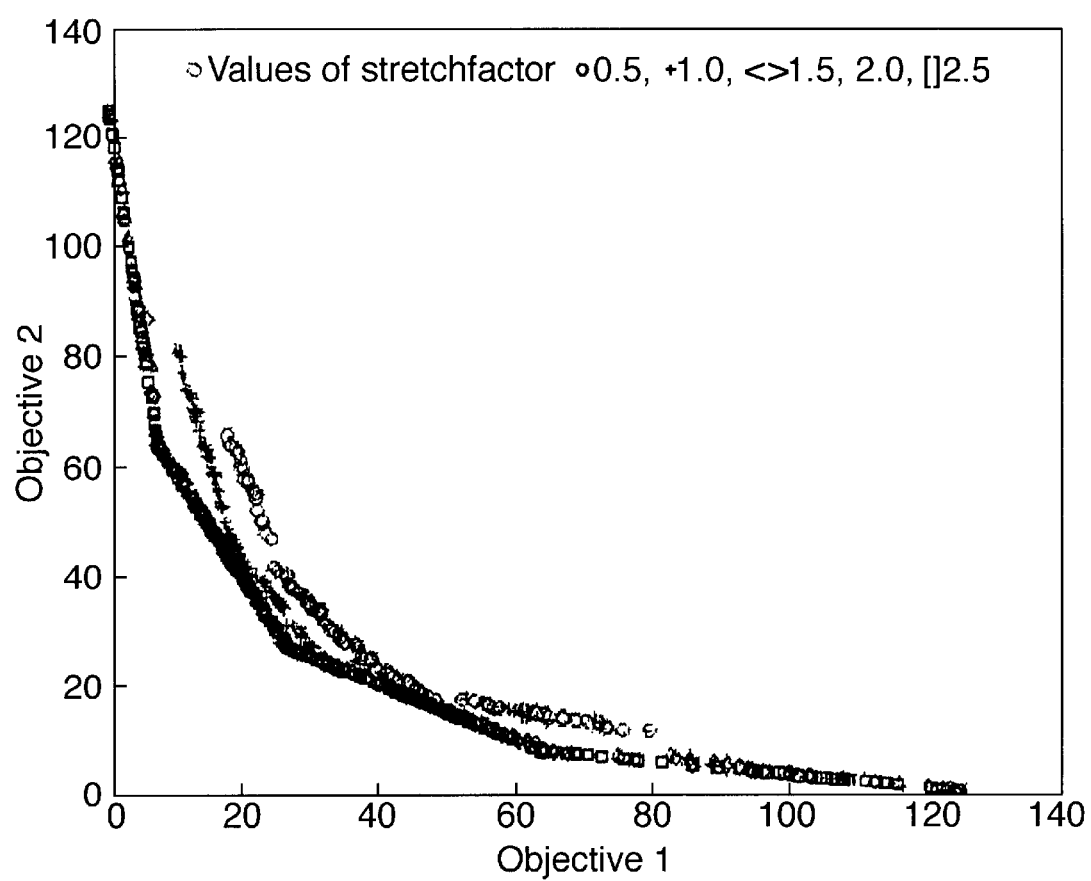
FIG. 12. Shows the set of calculated Pareto fronts generated as the stretch factor increases.

FIG. 12 illustrates the effects of increasing the stretch factor(s) within the crossover operator, upon the approximation found to the true Pareto front. With values of 0.5 and 1.0 (i.e., allowing offspring to be located only inside the region between the parents), the algorithms perform relatively poorly and can only approach the centre of the Pareto front within a certain distance. They do not reach any extreme values and are limited in their central ranges. The increase in the factor allows the entire front to be covered to the limits of the function, providing an excellent approximation for the solutions to this test problem. The extremes and vertices are explored well, despite the limitations of the line-searching operator for covering these regions; two parents from different line-segments may produce less than efficient offspring and an extreme point can only be bred by crossing two extreme parents. A careful balance of these effects with mutation and niching allow the full front to be covered.

FIG. 13 illustrates the variations in the best, mean and worst values found for the second performance measure as the stretch and crossover parameters increase, together with the standard deviation for each point of variation. As noted above, the behaviour of the first measure is reasonably correlated with the second for this particular single-front problem and is not included here. It can be seen that the increase in crossover and stretch size both have good effects on the results; the distances from the true Pareto front decrease and width of the approximated Pareto front increases as the stretch factor and proportion of crossovers increase. These results are also robust in that there is little variation between the measures once a good value for the parameters is found. The only exception to this point is the maximum application of the crossover (100%), which maintains the best values of measures but shows a little variation between the mean and worst values.

EXAMPLE IIb

This example involves an extension of the problem in Example IIa, with sigmoid rather than linear surfaces forming the Pareto front. These functions are defined as follows:

$$y_1 = \frac{1}{1+\exp(-2x_1+4x_2-2x_3+4x_4-3x_5)} + \frac{1}{1+\exp(4x_1-2x_2-2x_3-3x_4+4x_5)} \quad (2)$$

$$y_2 = \frac{1}{1+\exp(-2x_1+4x_2-2x_3-3x_4+4x_5)} + \frac{1}{1+\exp(-2x_2-2x_3+4x_1+4x_4-3x_5)}$$

where $x_i \in [0,1]$ and $\Sigma_{1-1}^{7} x_1 = 1$, and $x_6$ and $x_7$ are redundant inputs. The Pareto front now lies in both the interior and the exterior of the input space.

As above, the stretch factor affects the performance, with a value of s<1 giving a poor performance with a smaller range of distant points, compared to the higher factors, s>1, which cover the full range of the true Pareto front and are much closer to it. Again, 'Distance' is used as the performance measure.

FIG. 14 illustrates the variation in the maximum, mean and minimum values for each measure found over; as with the linear case, the increase in stretch factor and crossover improves the distance between the found and true Pareto fronts, and breadth of the Pareto fronts. Again, the measures are shown to increase as the crossover and stretch factors increase, and good approximations to the true Pareto front are found by the POGO method.

I claim:

1. A computer implemented method for optimising formulations wherein the formulation optimisation involves one or more of (a) optimisation of the type of ingredients in the formulation, (b) optimisation of the relative levels of ingredients in the formulation and (c) optimisation of the manufacturing conditions for the formulation against a number of criteria, comprising the steps of:
   (a) providing a model algorithm for each of the criteria, each model algorithm providing a prediction for a corresponding criteria when a candidate formulation is inputted into the model algorithm; and
   (b) selecting criteria to optimise a set of candidate formulations; and
   (c) providing an algorithm for optimisation of the set of candidate formulations in accordance with the selected criteria; and
   (d) creating computer-based output of the optimal set of candidate formulations; wherein a first set of one or more candidate formulations is provided and wherein the optimisation algorithm generates one or more new candidate formulations and wherein all candidate formulations are inputted into the number of model algorithms to obtain predictions, and wherein information of the set of candidate formulations obtained by said generation and/or previous optimisations and/or experiments is used to select candidate formulations from the set to obtain a Pareto optimal set of candidate formulations.

2. A computer implemented method according to claim 1 including a number of iteration steps in a loop as follows:
   (i) a first set of one or more candidate formulations are used as starting point;
   (ii) candidate formulations are inputted into the number of model algorithms to obtain predictions, and
   (iii) the optimisation algorithm generates one or more new candidate formulations; and
   (iv) the new candidate formulations are used as input into the number of model algorithms in iteration of step (ii), and wherein a Pareto optimal set of predictions are determined for selecting the candidate formulations.

3. A computer implemented method according to claim 1, wherein the optimisation algorithm generates new candidate formulations using information of the generated candidate formulations to obtain Pareto optimal candidate formulations, the information comprising formulation components, predictions and, if available, prediction error bars, the gradients and estimated gradients of predictions and/or prediction error bars, the constraints, and generally any other information available.

4. A computer implemented method according to claim 1, wherein the optimisation algorithm generates new candidate formulations in accordance with the landscape characteristic of the formulation landscape.

5. A computer implemented method according to claim 4, wherein the optimisation algorithm is a genetic algorithm and new formulations are generated according to a line cross-over search operator.

6. A computer implemented method according to claim 1, wherein at least one model algorithm provides a prediction with a prediction error bar for the corresponding criteria, wherein the optimisation algorithm determines Pareto optimal sets of predictions and prediction error bar(s) to select candidate formulations.

7. A computer implemented method according to claim 6, wherein candidate formulations are selected comprising predictions with minimised prediction error bars.

8. A computer implemented method according to claim 6, wherein a Bayesian neural network algorithm is used as a model algorithm providing a prediction and prediction error bar.

9. A computer implemented method according to claim 1, wherein constraints are defined regarding the candidate formulations and/or the predictions and/or the prediction error bar(s), wherein these constraints are used in the optimisation algorithm in selecting and/or generating the candidate formulations.

10. A computer implemented method according to claim 1, wherein the candidate formulations are displayed against selected sets of two or more of said number of criteria by way of computer based output.

11. A computer implemented method according to claim 10, wherein constraints on specific criteria can be introduced during displaying the candidate formulations against these specific criteria.

12. A computer implemented method according to claim 1, wherein constraints on the criteria can be introduced in an interactive manner to filter the optimised set of candidate formulations.

13. A computer implemented method according to claim 1, wherein the information of the Pareto optimal set of candidate formulations is used to determine a region of an experimental space for carrying out further experiments.

14. A computer implemented method according to claim 13, wherein the results of the further experiments are used to improve one or more of the model algorithms.

15. A computer implemented method according to claim 1, wherein the first set of candidate formulations is generated in a random manner or is seeded from formulations selected from the group of previous actual formulations, previous candidate formulations and optimised sets of candidate formulations.

16. A computer implemented method according to claim 15, wherein candidate formulations for the first set of formulations are obtained by a weighted optimisation algorithm.

17. A computer implemented method according to claim 1, wherein the method is used for optimising detergent products, food products, personal care products, fabric care products, household care products, or beverages.

18. A computer implemented method according to claim 1 wherein the formulation optimisation involves an optimisation of the relative levels of ingredients in the formulation optionally in combination with optimisation of the type of ingredients or the optimisation of the manufacturing conditions for the formulation.

19. A computer program device readable by a computer, comprising a computer program executable by the computer for effecting the computer to carry out a method comprising the steps of:

(a) providing a model algorithm for each of the criteria, each model algorithm providing a prediction for a corresponding criteria when a candidate formulation is inputted into the model algorithm; and selecting criteria to optimise a set of candidate formulations; and (c) providing an algorithm for optimisation of the set of candidate formulations in accordance with the selected criteria; and (d) creating computer-based output of the optimal set of candidate formulations; wherein a first set of one or more candidate formulations is provided and wherein the optimisation algorithm generates one or more new candidate formulations and wherein all candidate formulations are inputted into the number of model algorithms to obtain predictions, and wherein information of the set of candidate formulations obtained by said generation and/or previous optimisations and/or experiments is used to select candidate formulations from the set to obtain a Pareto optimal set of candidate formulations.

20. A computer program in a format downloadable by a computer, comprising a computer program executable by the computer to install the program in the computer for execution to effect the computer to carry out a method comprising the steps of:

(a) providing a model algorithm for each of the criteria, each model algorithm providing a prediction for a corresponding criteria when a candidate formulation is inputted into the model algorithm; and (b) selecting criteria to optimise a set of candidate formulations; and (c) providing an algorithm for optimisation of the set of candidate formulations in accordance with the selected criteria; and (d) creating computer-based output of the optimal set of candidate formulations; wherein a first set of one or more candidate formulations is provided and wherein the optimisation algorithm generates one or more new candidate formulations and wherein all candidate formulations are inputted into the number of model algorithms to obtain predictions, and wherein information of the set of candidate formulations obtained by said generation and/or previous optimisations and/or experiments is used to select candidate formulations from the set to obtain a Pareto optimal set of candidate formulations.

\* \* \* \* \*